(12) United States Patent
Zhao

(10) Patent No.: US 10,945,114 B2
(45) Date of Patent: Mar. 9, 2021

(54) QUICK ENABLING METHOD AND APPARATUS FOR SERVICE IN APPLICATION PROGRAM AND ELECTRONIC DEVICE

(71) Applicant: ADVANCED NEW TECHNOLOGIES CO., LTD., Grand Cayman (KY)

(72) Inventor: Landong Zhao, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 17/028,482

(22) Filed: Sep. 22, 2020

(65) Prior Publication Data
US 2021/0006959 A1    Jan. 7, 2021

Related U.S. Application Data

(63) Continuation of application No. 16/742,617, filed on Jan. 14, 2020, now Pat. No. 10,785,627, which is a
(Continued)

(30) Foreign Application Priority Data

Nov. 10, 2017  (CN) .......................... 201711105169.3

(51) Int. Cl.
*H04W 4/80* (2018.01)
*H04W 4/50* (2018.01)
(Continued)

(52) U.S. Cl.
CPC ............ *H04W 4/80* (2018.02); *H04B 5/0025* (2013.01); *H04B 5/0056* (2013.01); *H04W 4/50* (2018.02); *H04W 4/60* (2018.02)

(58) Field of Classification Search
CPC .................................. H04W 4/50; H04W 4/80
See application file for complete search history.

(56) References Cited

U.S. PATENT DOCUMENTS

| 7,797,535 B2 | 9/2010 | Sakai |
| 8,958,746 B2 | 2/2015 | Renard et al. |

(Continued)

FOREIGN PATENT DOCUMENTS

| CN | 101290669 A | 10/2008 |
| CN | 101546401 A | 9/2009 |

(Continued)

OTHER PUBLICATIONS

First Search for Taiwanese Application No. 107131689, dated Dec. 10, 2019, 1 page.
(Continued)

*Primary Examiner* — David Bilodeau

(57) ABSTRACT

Embodiments of this specification provide a method and apparatus for quick enabling a service in an application program and an electronic device. When a user terminal receives tag content transmitted by a near field communication (NFC) tag, an operating system of the user terminal may enable an application program that has registered NFC. Then, the enabled application program uploads the tag content to a server. According to a service routed by the server after the server decodes the tag content, the application program executes the routed service.

20 Claims, 7 Drawing Sheets

Related U.S. Application Data continuation of application No. PCT/CN2018/105916, filed on Sep. 17, 2018.

(51) Int. Cl.
*H04W 4/60* (2018.01)
*H04B 5/00* (2006.01)

(56) References Cited

U.S. PATENT DOCUMENTS

| | | |
|---|---|---|
| 9,596,006 B2 | 3/2017 | Chiba |
| 9,654,905 B2 | 5/2017 | Bell et al. |
| 10,075,027 B2 | 9/2018 | Zhao et al. |
| 10,181,774 B2 | 1/2019 | Waikar et al. |
| 10,257,780 B2 | 4/2019 | Khan et al. |
| 2005/0040951 A1 | 2/2005 | Zalewski et al. |
| 2006/0027666 A1 | 2/2006 | Glaser |
| 2007/0123305 A1 | 5/2007 | Chen et al. |
| 2010/0274726 A1 | 10/2010 | Florek et al. |
| 2013/0040561 A1 | 2/2013 | Conde et al. |
| 2013/0090150 A1 | 4/2013 | White |
| 2013/0303085 A1 | 11/2013 | Boucher et al. |
| 2014/0197991 A1 | 7/2014 | Mkrtchyan et al. |
| 2014/0201086 A1 | 7/2014 | Gadotti et al. |
| 2014/0207660 A1 | 7/2014 | Brink et al. |
| 2015/0052195 A1 | 2/2015 | Li |
| 2015/0121486 A1 | 4/2015 | Ye |
| 2016/0057298 A1 | 2/2016 | Sasase |
| 2016/0119032 A1 | 4/2016 | Choi et al. |
| 2017/0308150 A1 | 10/2017 | Khan et al. |
| 2018/0176756 A1 | 6/2018 | Buscemi et al. |
| 2019/0014608 A1 | 1/2019 | Asakura et al. |
| 2019/0043038 A1 | 2/2019 | Jang et al. |
| 2019/0066090 A1 | 2/2019 | Mei et al. |
| 2019/0148978 A1 | 5/2019 | Chang et al. |

FOREIGN PATENT DOCUMENTS

| | | |
|---|---|---|
| CN | 101867396 A | 10/2010 |
| CN | 102160068 A | 8/2011 |
| CN | 102811376 A | 12/2012 |
| CN | 102938117 A | 2/2013 |
| CN | 102970063 A | 3/2013 |
| CN | 102982446 A | 3/2013 |
| CN | 103208075 A | 7/2013 |
| CN | 103606079 A | 2/2014 |
| CN | 103914770 A | 7/2014 |
| CN | 103971153 A | 8/2014 |
| CN | 104951837 A | 9/2015 |
| CN | 105163153 A | 12/2015 |
| CN | 105228087 A | 1/2016 |
| CN | 204967883 U | 1/2016 |
| CN | 105391785 A | 3/2016 |
| CN | 105391890 A | 3/2016 |
| CN | 105549987 A | 5/2016 |
| CN | 105700910 A | 6/2016 |
| CN | 105701656 A | 6/2016 |
| CN | 105912942 A | 8/2016 |
| CN | 106020876 A | 10/2016 |
| CN | 106096950 A | 11/2016 |
| CN | 106136492 A | 11/2016 |
| CN | 106657631 A | 5/2017 |
| CN | 206193811 U | 5/2017 |
| CN | 108055293 A | 5/2018 |
| TW | 201516907 A | 5/2015 |
| TW | 201516921 A | 5/2015 |
| TW | 201528170 A | 7/2015 |
| TW | 201539341 A | 10/2015 |
| WO | 2005086073 A1 | 9/2005 |
| WO | 2013163941 A1 | 11/2013 |
| WO | 2017/185367 A1 | 11/2017 |

OTHER PUBLICATIONS

First Search for Chinese Application No. 201711105169.3, dated Dec. 25, 2019, 2 pages.
First Office Action for Chinese Application No. 201711105169.3, dated Jan. 13, 2020, 24 pages.
International Search Report and Written Opinion of the International Searching Authority for International Application No. PCT/CN2018/105916, dated Oct. 31, 2018, with partial machine English translation, 9 pages.
Search Report for European Application No. 18875570.6 dated Jun. 15, 2020.

US 10,945,114 B2

QUICK ENABLING METHOD AND APPARATUS FOR SERVICE IN APPLICATION PROGRAM AND ELECTRONIC DEVICE

CROSS REFERENCE TO RELATED APPLICATION

The present application is a continuation of U.S. application Ser. No. 16/742,617, filed on Jan. 14, 2020, now allowed, which is a continuation application of International Patent Application No. PCT/CN2018/105916, filed on Sep. 17, 2018, which claims priority to Chinese Patent Application No. 201711105169.3, filed on Nov. 10, 2017. The entire content of the above referenced applications are incorporated herein by reference.

TECHNICAL FIELD

Embodiments of this specification relate to the field of Internet technologies, and in particular, to a method, an apparatus, and an electronic device for quick enabling a service in an application program.

BACKGROUND

With continuous development of Internet technologies, code scanning interaction has become an Internet interaction method frequently used in people's daily life. Such interaction includes, for example, scanning to pay, scanning to order, scanning to download, or scanning to ride (for example, a shared bike). Using scanning to pay as an example, as shown in FIG. 1, a merchant may apply for a collection code with a graphic code (which is a two-dimensional code in FIG. 1). During payment, as shown in FIG. 2, a user needs to open a payment application, clicks "scan" in the payment application to enable a scan frame, and aligns the scan frame with the collection code for scanning to complete the payment. As being convenient, fast, and secure, scanning to pay has become the mainstream of mobile payment. However, in an actual application, a scanning process is often affected by external environmental factors, such as dim light at night or extremely bright light at noon, leading to a scanning failure or unrecognition.

Therefore, a more effective Internet interaction method needs to be provided.

SUMMARY

Embodiments of this specification provide a method, an apparatus, and an electronic device for quick enabling a service in an application program.

According to a first aspect of the embodiments of this specification, a method for quick enabling a service in an application program is provided, where the method may include: enabling, by an operating system, an application program that has registered near field communication (NFC) when tag content transmitted by an NFC tag is received; uploading, by the enabled application program, the tag content to a server; and executing, by the enabled application program a service routed by the server after the tag content is decoded by the server.

In some embodiments, the enabling, by an operating system, an application program that has registered NFC comprises: when there are at least two application programs that have registered NFC, presenting, by the operating system, the at least two application programs that have registered NFC on a screen; and enabling, by the operating system, one of the at least two application programs selected by a user.

In some embodiments, the enabling, by an operating system, an application program that has registered NFC comprises: enabling, by the operating system, an application program that has registered NFC and that is associated with the NFC tag.

In some embodiments, the tag content transmitted by the NFC tag is encrypted tag content; and before the uploading, by the enabled application program, the tag content to a server, the method further comprises: decrypting, by the enabled application program, the tag content.

In some embodiments, the tag content comprises at least a service source; before the uploading, by the enabled application program, the tag content to a server, the method further comprises: determining, by the enabled application program, whether the service source in the tag content is the enabled application program; and the uploading, by the enabled application program, the tag content to a server comprises: when an application identifier in the tag content represents the enabled application program, uploading, by the enabled application program, the tag content to the server.

In some embodiments, the tag content comprises at least a service type; and the service routed by the server corresponds to the service type, wherein the service type is obtained by the server after decoding the tag content.

In some embodiments, the tag content transmitted by an NFC tag is sent by a smart wearable device, after the smart wearable device receives the tag content transmitted by the NFC tag.

In some embodiments, the application program comprises a payment application, and the service comprises a payment service; or the application program comprises a bike sharing application, and the service comprises a bike renting service.

According to a second aspect of the embodiments of this specification, a method for quick enabling a service in an application program is provided, where the method may include: enabling, by an operating system, an application program that has registered NFC when tag content transmitted by an NFC tag is received; decoding, by the enabled application program, the tag content to obtain a service type; initiating, by the enabled application program, a service request of the service type to a server according to the service type; and executing, by the enabled application program according to a service that is routed by the server and that corresponds to the service request, the routed service.

In some embodiments, the enabling, by an operating system, an application program that has registered NFC comprises: when there are at least two application programs that have registered NFC, presenting, by the operating system, the at least two application programs that have registered NFC in a screen; and enabling, by the operating system, one of the at least two application programs selected by a user.

In some embodiments, the enabling, by an operating system, an application program that has registered NFC comprises: enabling, by the operating system, an application program that has registered NFC and that is associated with the NFC tag.

In some embodiments, the tag content transmitted by the NFC tag is encrypted tag content; and the obtaining a service type by decoding the tag content comprises: decrypting, by the enabled application program, the tag content.

In some embodiments, the tag content comprises at least a service source; the obtaining a service type by decoding the tag content further comprises: determining, by the enabled application program, whether the service source in the tag content is the enabled application program; and when an application identifier in the tag content represents the enabled application program, decoding, by the enabled application program, the tag content to obtain the service type.

In some embodiments, the tag content transmitted by an NFC tag is sent by a smart wearable device, after the smart wearable device receives the tag content transmitted by the NFC tag.

In some embodiments, the enabled application program comprises a payment application, and the service comprises a payment service; or the enabled application program comprises a bike sharing application, and the service comprises a bike renting service.

In some embodiments, the enabled application program comprises a payment application, and the service comprises a payment service; or the enabled application program comprises a bike sharing application, and the service comprises a bike renting service.

According to a third aspect of the embodiments of this specification, an apparatus for quick enabling a service in an application program is provided, where the apparatus may include: an enabling unit, configured to: enable an application program that has registered NFC when tag content transmitted by an NFC tag is received; an upload unit, configured to: upload, by the enabled application program, the tag content to a server; and an execution unit, configured to: execute, by the application program a service routed by the server after the tag content is decoded by the server.

According to a fourth aspect of the embodiments of this specification, an apparatus for quick enabling a service in an application program is provided, where the apparatus may include: an enabling unit, configured to: enable an application program that has registered NFC when tag content transmitted by an NFC tag is received; a decoding unit, configured to decode, by the enabled application program, the tag content to obtain a service type; a request unit, configured to initiate, by the enabled application program, a service request of the service type to a server according to the service type; and an execution unit, configured to execute, by the enabled application program according to a service that is routed by the server and that corresponds to the service request, the routed service.

According to a fifth aspect of the embodiments of this specification, an electronic device is provided, where the electronic device may include: a processor; and a memory that is configured to store an instruction executable by the processor, where the processor is configured to: enable an application program that has registered NFC when tag content transmitted by an NFC tag is received; upload, by the enabled application program, the tag content to a server; and execute, by the application program a service routed by the server after the tag content is decoded by the server.

According to a sixth aspect of the embodiments of this specification, an electronic device is provided, where the electronic device may include: a processor; and a memory that is configured to store an instruction executable by the processor, where the processor is configured to: enable an application program that has registered NFC when tag content transmitted by an NFC tag is received; decode, by the enabled application program, the tag content to obtain a service type; initiate, by the enabled application program, a service request of the service type to a server according to the service type; and execute, by the enabled application program according to a service that is routed by the server and that corresponds to the service request, the routed service.

In the embodiments of this specification, an NFC technology is used, for a user terminal to quickly enable an application program according to an NFC tag. In addition, the enabled application program may further automatically execute a corresponding service according to tag content transmitted by the NFC tag. In this way, a user does not need to manually enable the application program or manually click a corresponding service button to execute the service, thereby improving Internet interaction efficiency. Moreover, the interaction method provided in the embodiments is not affected by external environmental factors.

DETAILED DESCRIPTION OF THE INVENTION

Figure 1:
FIG. 1 is a schematic diagram of an existing merchant collection code, according to some embodiments.
Figure 2:
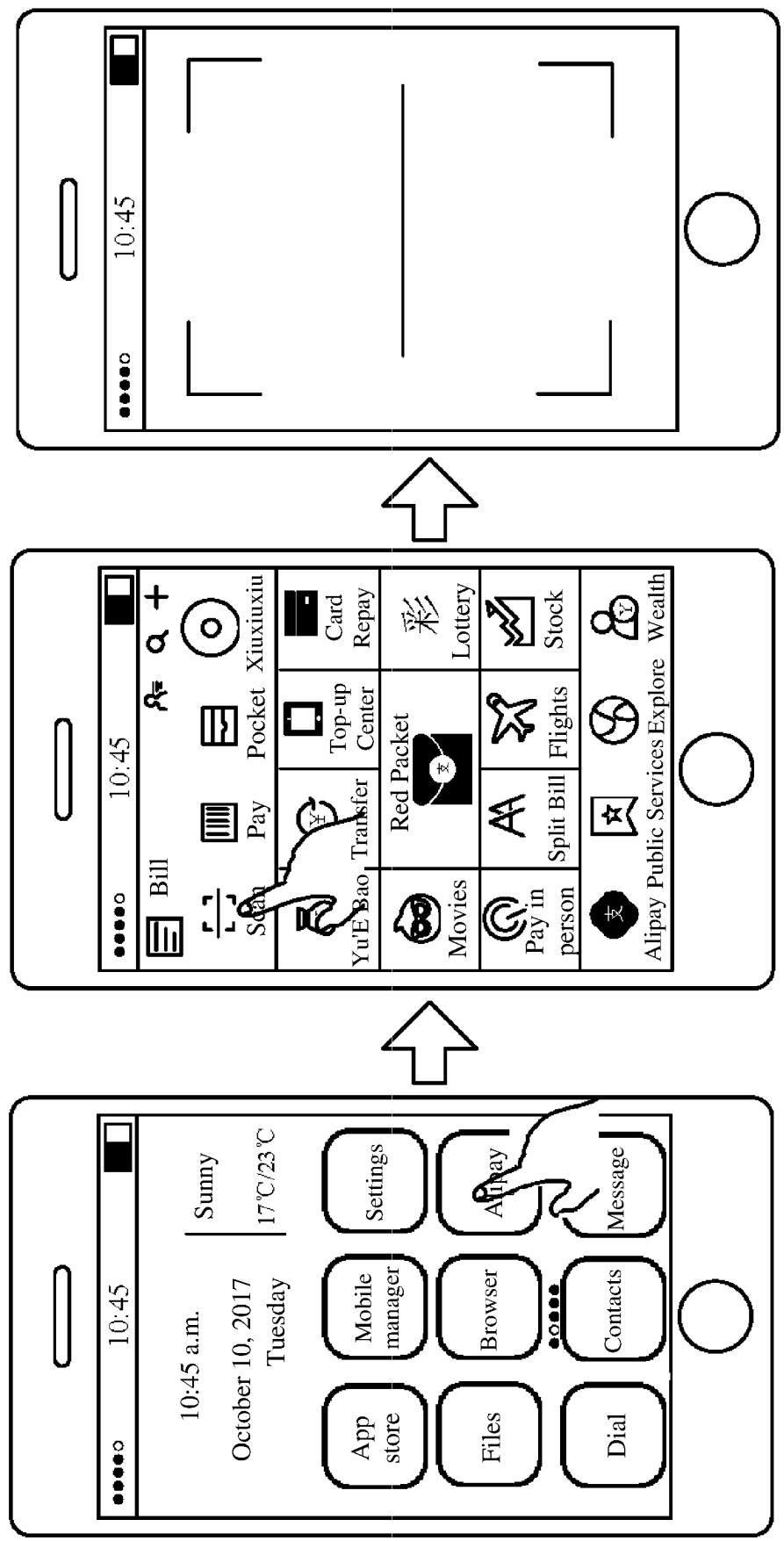
FIG. 2 is a schematic diagram of an existing process in which a user terminal "scans," according to some embodiments.

Exemplary embodiments are described in detail herein, and examples of the exemplary embodiments are shown in the accompanying drawings. When the following descriptions relate to the accompanying drawings, unless indicated otherwise, the same numbers in different accompanying drawings represent the same or similar elements. Implementations described in the following exemplary embodiments are not all implementations of this specification. On the contrary, the implementations described herein are merely examples of the apparatus and method that are described in claims in detail and that are consistent with some aspects of this specification.

The terms used in this specification are merely for the purpose of describing specific embodiments, and are not intended to limit this specification. The terms "a," "said" and "the" of singular forms used in this specification and the appended claims are also intended to include plural forms, unless otherwise specified in the context clearly. The term "and/or" used herein indicates and includes any or all possible combinations of one or more associated listed items.

The terms such as first, second, and third may be used herein to describe various information, such information should not be limited to these terms. These terms are merely used for distinguishing information of the same type from each other. For example, within the scope of this specification, first information may also be referred to as second information, and similarly, second information may also be referred to as first information. Depending on the context, the term "if" as used herein may be interpreted as "when . . . " or "upon . . . " or "in response to determining."

Using a scenario of scanning to pay as an example, a user first needs to open a payment application, then clicks "scan" in the payment application to enable a scan frame, and aligns the scan frame with a collection code for scanning to complete the payment. As described above, scanning is easily affected by external environmental factors. For example, a user needs to scan to pay a taxi driver after taking a taxi at night, but due to the dim light in the car, the user often fails to scan a collection code of the driver or needs to repeat scanning a plurality of times before successful payment, which greatly affects user experience.

Using a bike sharing scenario as another example, due to characteristics of on-demand parking, shared bikes quickly spread to some areas of the country and even abroad. To use a shared bike, a user first needs to open a bike sharing application (APP) installed on a mobile terminal, then clicks "scan to ride" to enable a scan frame, and then aligns the frame with a two-dimensional code set on the shared bike for scanning. After the scanning succeeds, the shared bike is automatically unlocked, and the user may use the shared bike. As described above, scanning is easily affected by external environmental factors, and due to dim light at night, scanning with a mobile phone often fails, which greatly affects user experience.

Figure 3:
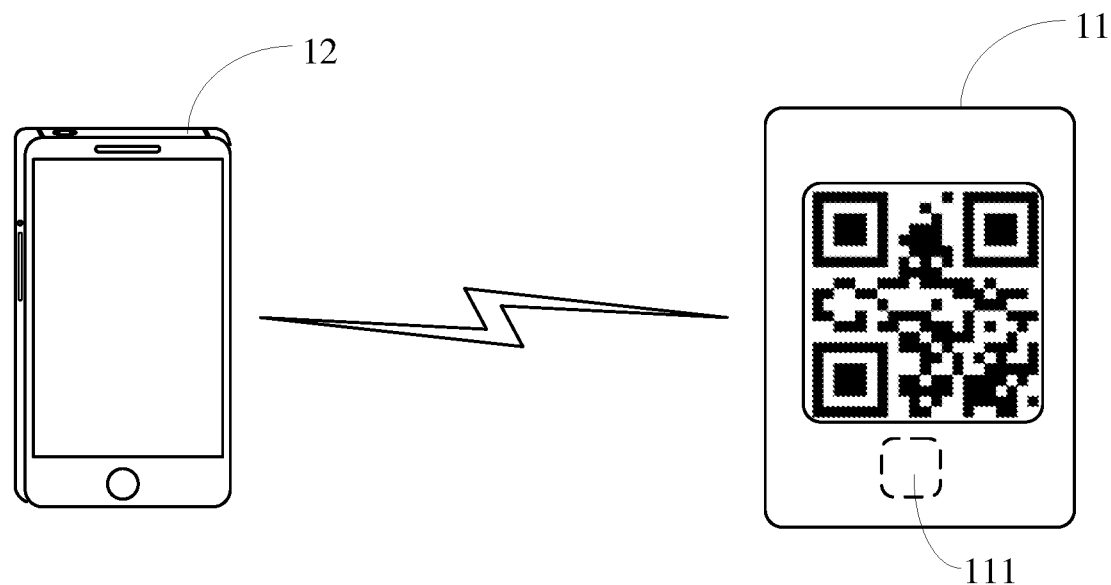
FIG. 3 is a concept diagram of a system architecture applicable to quick enabling of a service in an application program, according to an embodiment of this specification.

To resolve the foregoing problem, this specification provides a schematic concept diagram of an applicable system architecture shown in FIG. 3. The concept diagram of the system architecture may include a target object 11 provided with an NFC tag 111 and a user terminal 12.

To achieve commonality with existing "scanning," the target object 11 that is shown in FIG. 3 and that is provided with the NFC tag 111 may be a graphic code provided with the NFC tag 111. Compared with the conventional graphic code shown in FIG. 1, the graphic code in FIG. 3 has an NFC tag 111. The graphic code provided with the NFC tag 111 is merely an example of the target object. The target object may alternatively be in any other form. The location, size, and/or shape of the NFC tag 111 may be adjusted according to actual needs.

The NFC tag 111 may transmit data to the user terminal 12 with an NFC function, and transmit tag content written into the NFC tag 111 to the user terminal 12 with the NFC function.

Figure 4:
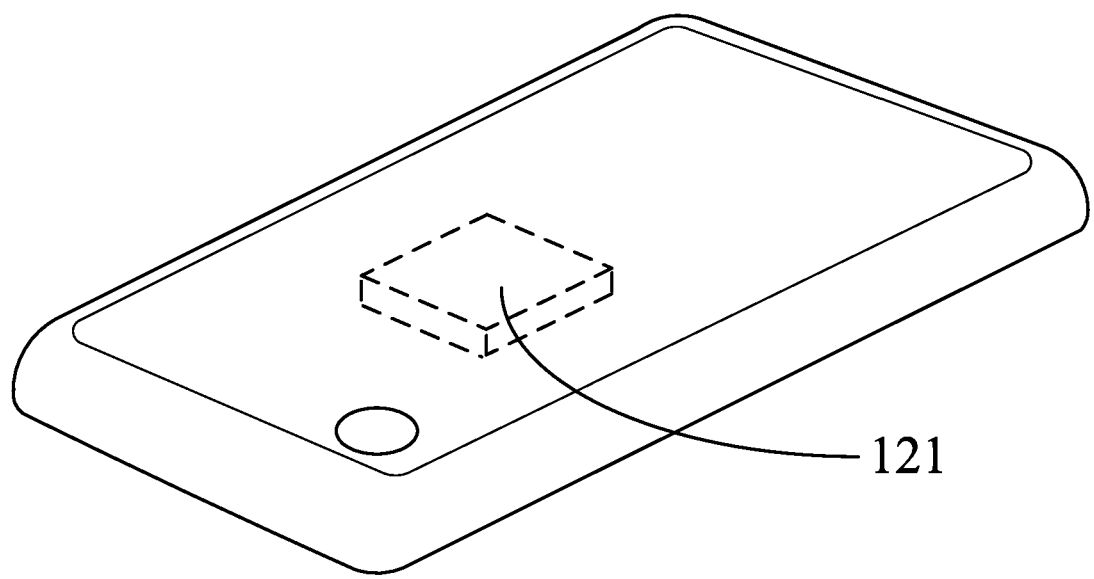
FIG. 4 is a schematic diagram of a user terminal, according to some embodiments.

The user terminal 12 may be a terminal that is provided with an NFC chip and that has the NFC function, such as a smartphone or a tablet computer. As shown in a schematic diagram of the user terminal in FIG. 4, an NFC chip 122 may be disposed inside the user terminal. A location of the NFC chip 122 in the figure is merely an example. The location, size, and/or shape of the NFC chip may be adjusted according to an actual situation.

NFC is a non-contact short-range high-frequency radio technology. NFC may use a frequency band of 13.56 MHz, and a use range usually falls within 10 cm. The NFC chip may continuously send a radio frequency signal when enabled. The NFC tag may be a coil into which data may be written, and when coming into contact with the radio frequency signal sent by the NFC chip, the coil may generate a signal carrying the written data. A reader in the NFC chip may read the signal and parse out the carried data. In this specification, the data may refer to as the tag content.

Figure 5:
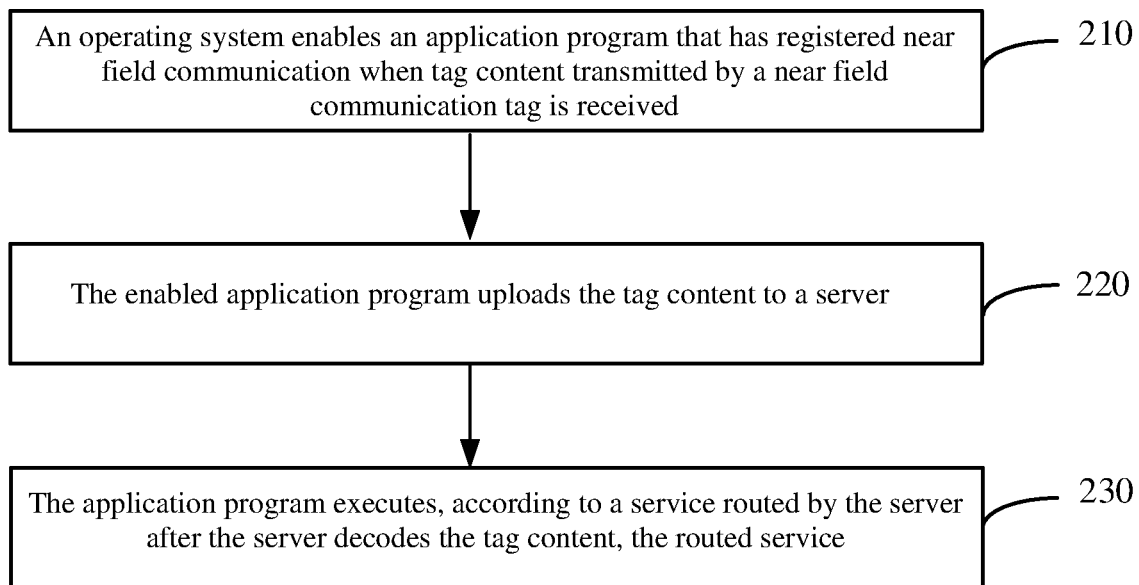
FIG. 5 is a flowchart of a method for quick enabling a service in an application program, according to an embodiment of this specification.

The following may describe an embodiment of a method for quick enabling a service in an application program in this specification with reference to the example shown in FIG. 5. The method may be applied to a user terminal provided with an NFC chip. The method may include the following steps:

Step 210: An operating system enables an application program that has registered NFC when tag content transmitted by an NFC tag is received.

The operating system (OS, or may be referred to as a computer management and control program) may be a computer program that manages and controls hardware and software resources of the terminal, and is a basic system software running on the terminal. Other software and application programs need to be supported by the operating system. A typical operating system is, for example, an Android system of an Android mobile phone (such as a Huawei mobile phone, a Xiaomi mobile phone, or a Samsung mobile phone), an iOS system of an Apple mobile phone, or a Windows Phone system of a Microsoft mobile phone.

To be enabled by the operating system, the application program first needs to register NFC in advance. Specifically, a user may register application programs allowed to use NFC in the user terminal. For example, NFC may be configured in the operating system, and the user may add a necessary application program, to complete NFC registration of the application program.

The application program registers the NFC to declare to the operating system that the application program may use an NFC function. In this way, the application program that has registered NFC may be enabled by the operating system when the user terminal receives the tag content transmitted by the NFC tag.

For example, an Alipay™ application is installed in a user terminal, and the Alipay™ application has successfully registered NFC. Assuming that the user uses the user terminal approaching a collection code shown in FIG. 3, because an NFC tag is set in the collection code, the operating system may automatically enable the Alipay™ application.

Step 220: The enabled application program uploads the tag content to a server.

In the previous step, the user terminal enables the application program that has registered NFC. Therefore, in this step, the enabled application program may further upload, to the server, the tag content transmitted by the NFC tag.

The server may refer to a server of the application program. For example, the Alipay™ application may upload the tag content to an Alipay™ server.

Step 230: The application program executes, a service routed by the server after the tag content is decoded by the server.

After receiving the tag content uploaded by the application program, the server may decode the tag content to obtain a service type, and route a corresponding service according to the service type.

The tag content may be a character string arranged according to a specific rule, and the character string may represent various types of information.

For example, a specific piece of tag content is code=xxyyzz, where yy represents a service type, and xx and zz represent other information. If the server does not perform decoding, the server cannot determine a specific service type according to xxyyzz. Therefore, after receiving the tag content, the server needs to decode the tag content, and extracts one or more characters, in this case, yy according to the arrangement rule of the tag content (a third and a fourth bits represent the service type). Assuming that yy represents a service A, the server may route the corresponding service A according to yy.

Using a payment scenario as an example, the Alipay™ application uploads a piece of tag content. Assuming that a service type obtained by the server after decoding is payment, a payment service may be routed. Assuming that a service type obtained after decoding is money collection, a money collection service may be routed.

Correspondingly, the application program in the user terminal may also execute, a service routed by the server. For example, an Alipay™ application in the user terminal may execute a payment operation according to a payment service routed by the server.

In this embodiment, an NFC technology is used; when a user terminal approaches a target object with an NFC tag, an operating system of the user terminal may quickly enable an application program according to the NFC tag; and the enabled application program may further automatically execute a corresponding service according to tag content transmitted by the NFC tag. In this way, a user does not need to manually enable the application program or manually click a corresponding service button to execute the service, thereby improving interaction efficiency. Moreover, the interaction method provided in the embodiments is not affected by external environmental factors.

Using a payment scenario as an example below, the user terminal approaches a payment object (for example, a collection code) with an NFC tag, the operating system of the user terminal may quickly enable a payment application, and the enabled payment application may further automatically execute a corresponding payment service according to tag content transmitted by the NFC tag. In this way, even a payment performed at night is not affected by insufficient light.

Using a bike sharing scenario as an example below, the user terminal approaches a shared bike with an NFC tag, the operating system of the user terminal may quickly enable a bike sharing application, and the enabled bike sharing application may further automatically execute a corresponding bike renting service according to tag content transmitted by the NFC tag. In this way, even use of a shared bike at night is not affected by insufficient light.

In an actual application, there may be a plurality of application programs that register NFC. In this case, the operating system cannot proactively determine which application program should be enabled. To resolve this problem, based on the embodiment shown in FIG. 5, in step 210, the enabling, by an operating system, an application program that has registered NFC may include:

when there are at least two application programs that have registered NFC, presenting, by the operating system, the application programs that have registered NFC in a screen; and enabling, by the operating system, one of the application programs selected by a user.

In this embodiment, when there are at least two application programs that have registered NFC, the operating system of the user terminal may present these application programs that have registered NFC in a screen of the terminal, for the user to manually determine an application program to be enabled, and the operating system only needs to enable the application program selected by the user.

In this embodiment, when there are a plurality of application programs that register NFC, the operating system may also enable an application program according to selection by the user.

In the embodiment in which the user manually determines an application program, the user may make an incorrect choice. To resolve this problem, based on the embodiment shown in FIG. 5, in another specific embodiment provided in this specification, the tag content may include at least a service source, and before step 220, the method may further include:

determining, by the enabled application program, whether the service source in the tag content is the enabled application program.

Step 220 may include: when an application identifier in the tag content represents the enabled application program, uploading, by the enabled application program, the tag content to the server; or when an application identifier in the tag content does not represent the enabled application program, terminating an operation.

In this embodiment, the incorrectly enabled application program should not be allowed to perform a service operation that originally needs to be performed by the service source in the tag content. The service source in the tag content is used to determine whether the enabled application program really needs to be enabled; and if yes, a subsequent step is performed; or if no, the operation is terminated.

Similarly, to resolve a problem that the operating system cannot proactively determine which application program should be enabled, based on the embodiment shown in FIG. 5, in step 210, the enabling, by an operating system, an application program that has registered NFC may include: enabling, by the operating system, an application program that has registered NFC and that is associated with the NFC tag.

A difference between this embodiment and the foregoing NFC registration lies in that in this embodiment, when the application program registers NFC, in addition to adding the application program, an NFC tag may further be associated with the application program. For example, when registering NFC, the Alipay™ application may be associated with an Alipay™ NFC tag.

In some embodiments, one application program may be allowed to be associated with one NFC tag. For example, the Alipay™ application is allowed to be associated with an NFC tag released by Alipay™ application. For example, application programs that have registered NFC in a user terminal may include an Alipay™ application, a bike sharing application, and a WeChat™ application, where the Alipay™ application is associated with the Alipay™ NFC tag. Assuming that the user terminal approaches the collection code shown in FIG. 3, because the Alipay™ NFC tag is set in the collection code, an operating system of the user terminal may directly enable the Alipay™ application according to an association relationship.

In this embodiment, an association relationship between an application program that registers NFC and an NFC tag is established, and when tag content transmitted from the NFC tag is received, an operating system may directly enable the application program that is associated with the NFC tag and that has registered NFC, thereby further improving interaction efficiency.

In some embodiments, for the NFC tag, the tag content may be modified, which may be risky for some sensitive services such as the payment services. To prevent the tag content of the NFC tag from being maliciously tampered with, based on the embodiment shown in FIG. 5, the tag content transmitted by the NFC tag is encrypted tag content.

Correspondingly, before step 220, the method may further include decrypting, by the enabled application program, the tag content.

In this embodiment, the tag content of the NFC tag set in the target object may be encrypted tag content.

For example, tag content of an NFC tag written into a collection code provided by Alipay™ for a merchant is encrypted tag content. A malicious user intending to tamper with the tag content cannot decrypt the encrypted tag content without a corresponding decryption algorithm. Furthermore, the tag content cannot be decrypted by an application program if the tag content is not properly encrypted by a corresponding encryption algorithm.

Usually, an application program downloaded by a user terminal from a regular download channel is built with a decryption algorithm. In addition, the decryption algorithm of the application program matches an encryption algorithm for encrypting the content of an NFC tag.

In this embodiment, the tag content in the NFC tag is encrypted, thereby improving interaction security, preventing a user from suffering from unnecessary loss caused by malicious tampering of the tag content, and improving user experience.

Figure 6:
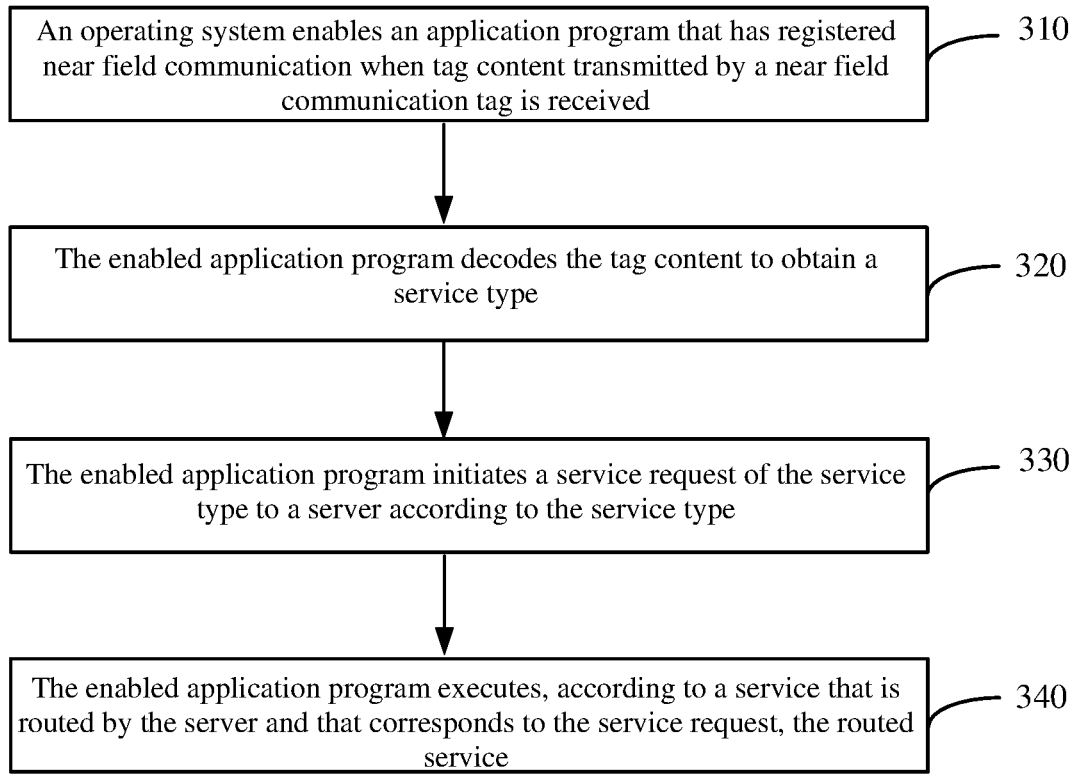
FIG. 6 is a flowchart of a method for quick enabling a service in an application program, according to an embodiment of this specification.

The following may describe an embodiment of a method for quick enabling a service in an application program with reference to an example shown in FIG. 6. The method may be applied to a terminal provided with an NFC chip. The method may include the following steps:

Step 310: An operating system enables an application program that has registered NFC when tag content transmitted by an NFC tag is received. This step is the same as step 210, and details are not described herein again.

Step 320: The enabled application program decodes the tag content to obtain a service type. The tag content may be a character string arranged according to a specific rule, and the character string may represent various types of information. For example, a specific piece of tag content is code=xxyyzz, where yy represents a service type, and xx and zz represent other information. The enabled application program may decode the service type, namely, the characters yy, according to an arrangement rule of the tag content (e.g., a third and a fourth bits represent the service type).

Step 330: The enabled application program initiates a service request of the service type to a server according to the service type. After decoding the service type, the enabled application program may initiate the service request of the service type to the server. The server may refer to a server of the application program. For example, an Alipay™ application may initiate a service request of the service type to an Alipay™ server.

Step 340: The enabled application program executes, according to a service that is routed by the server and that corresponds to the service request, the routed service. Using a payment scenario as an example, the Alipay™ application may initiate a payment service request to the Alipay™ server, and the Alipay™ server may route a payment service. Similarly, assuming that a service request for collecting money is initiated, the Alipay™ server may route a money collection service.

Correspondingly, an application program in a user terminal may also execute a service routed by the server. For example, an Alipay™ application in the user terminal executes a payment operation according to a payment service routed by the server.

In this embodiment, the application program in the user terminal decodes the service type, while in the embodiment shown in FIG. 5, the server decodes the service type.

In this embodiment, when a user terminal approaches a target object with an NFC tag, an operating system of the user terminal may quickly enable an application program according to the NFC tag; and the enabled application program may further automatically execute a corresponding service according to tag content transmitted by the NFC tag. In this way, a user does not need to manually enable the application program or manually click a corresponding service button to execute the service, thereby improving interaction efficiency. Moreover, the interaction method provided in the embodiments is not affected by external environmental factors.

Based on the embodiment shown in FIG. 6, in a specific embodiment, in step 310, the enabling, by an operating system, an application program that has registered NFC may include: when there are at least two application programs that have registered NFC, presenting, by the operating system, the application programs that have registered NFC in a screen; and enabling, by the operating system, an application program selected by a user.

Based on the embodiment shown in FIG. 6, in a specific embodiment, the tag content may include at least a service source, and before step 320, the method may further include determining, by the enabled application program, whether the service source in the tag content is the enabled application program.

Step 320 may include: when an application identifier in the tag content represents the enabled application program, decoding, by the enabled application program, the tag content to obtain the service type; or when an application identifier in the tag content does not represent the enabled application program, terminating an operation.

Based on the embodiment shown in FIG. 6, in a specific embodiment, in step 310, the enabling, by an operating system, an application program that has registered NFC may include enabling, by the operating system, an application program that has registered NFC and that is associated with the NFC tag.

Based on the embodiment shown in FIG. 6, in a specific embodiment, the tag content transmitted by the NFC tag is encrypted tag content.

Before step 320, the method may further include decrypting, by the enabled application program, the tag content.

In this embodiment, the tag content in the NFC tag is encrypted, thereby improving interaction security, preventing a user from suffering from unnecessary loss caused by malicious tampering of the tag content, and improving user experience.

Based on the embodiment shown in FIG. 6, the application program may include a payment application, and the service may include a payment service; or the application program may include a bike sharing application, and the service may include a bike renting service.

Figure 7:
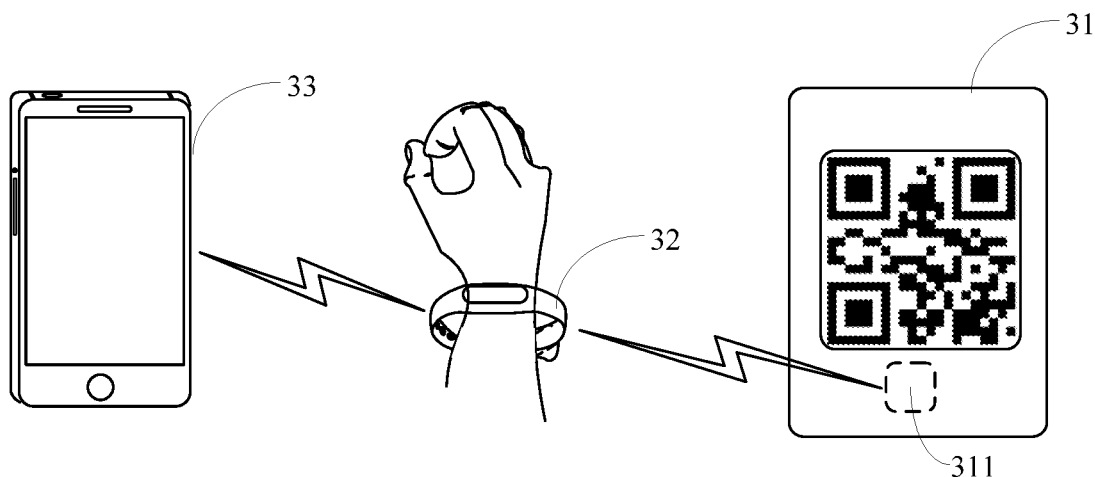
FIG. 7 is a concept diagram of another system architecture applicable to quick enabling of a service in an application program, according to an embodiment of this specification.

This specification further provides a schematic concept diagram of another applicable system architecture shown in FIG. 7. The concept diagram of the system architecture may include a target object 31 provided with an NFC tag 311, a smart wearable device 32, and a user terminal 33. The target object 31 provided with the NFC tag 311 is the same as the target object 11 in FIG. 3, and details are not described herein again.

The NFC tag 311 in the target object 31 may transmit data with the smart wearable device 32, to transmit tag content written into the NFC tag 311 to the smart wearable device 32 with an NFC function.

The smart wearable device 32 may be provided with an NFC chip with the NFC function, and is, for example, smart bracelets, smart watches, or smart glasses.

The smart wearable device 32 may further exchange data with the user terminal 33 by using a short-range wireless communications technology (one of Bluetooth, infrared, a wireless local area network, Wi-Fi direct connection, ultra-broadband communication, ZigBee, or NFC).

The user terminal 33 is different from the user terminal 12 in FIG. 3. The user terminal 33 does not directly transmit data with the target object 31, but indirectly transmits data by using the smart wearable device 32. Specifically, the smart wearable device 32 may receive the tag content transmitted by the NFC tag 311 in the target object 31, and sends the tag content to the user terminal 33.

In one embodiment, the user terminal 33 may be provided with no NFC chip. In another embodiment, the user terminal 33 is provided with an NFC chip, but does not need to use the NFC chip.

An embodiment of a method for quick enabling a service in an application program in this specification is described based on the embodiment shown in FIG. 5 with reference to the concept diagram of the system architecture shown in FIG. 7. The method may be applied to a user terminal, and the method may include the following steps: enabling, by an operating system, an application program that has registered NFC when tag content transmitted by an NFC tag is received by the application program from a smart wearable device, after the smart wearable device receives the tag content transmitted by the NFC tag; uploading, by the enabled application program, the tag content to a server; and executing, by the application program a service routed by the server after the tag content is decoded by the server.

A difference between this embodiment and the embodiment shown in FIG. 5 lies in that the tag content received by the user terminal is sent by the smart wearable device. In other words, after receiving the tag content transmitted by the NFC tag, the smart wearable device may send the tag content to the user terminal. Other content in this embodiment is the same as that in the embodiment shown in FIG. 5. Details are not described herein again.

Similarly, an embodiment of a method for quick enabling a service in an application program in this specification is described based on the embodiment shown in FIG. 6 with reference to the concept diagram of the system architecture shown in FIG. 7. The method may be applied to a user terminal, and the method may include the following steps: enabling, by an operating system, an application program that has registered NFC when tag content transmitted by an NFC tag that is received from a smart wearable device, after the smart wearable device receives the tag content transmitted by the NFS tag; decoding, by the enabled application program, the tag content to obtain a service type; initiating, by the enabled application program, a service request of the service type to a server according to the service type; and executing, by the enabled application program a service that is routed by the server and that corresponds to the service request.

A difference between this embodiment and the embodiment shown in FIG. 6 lies in that the tag content received by the user terminal is sent by the smart wearable device. In other words, after receiving the tag content transmitted by the NFC tag, the smart wearable device may send the tag content to the user terminal. Other content in this embodiment is the same as that in the embodiment shown in FIG. 6. Details are not described herein again.

In the foregoing embodiment, an NFC technology is used; after approaching a target object with an NFC tag, the smart wearable device may send received tag content to a user terminal; and then an operating system of the user terminal may quickly enable an application program according to the NFC tag, and the enabled application program may further automatically execute a corresponding service according to the tag content transmitted by the NFC tag. In this way, a user does not need to manually enable the application program or manually click a corresponding service button to execute the service, thereby improving interaction efficiency. Moreover, the interaction method provided in the embodiments is not affected by external environmental factors.

Using a payment scenario as an example below, the smart wearable device approaches a payment object (for example, a collection code) with an NFC tag, the operating system of the user terminal may quickly enable a payment application, and the enabled payment application may further automatically execute a corresponding payment service according to tag content transmitted by the NFC tag. In this way, even a payment performed at night is not affected by insufficient light.

Using a bike sharing scenario as an example below, the smart wearable device approaches a shared bike with an NFC tag, the operating system of the user terminal may quickly enable a bike sharing application, and the enabled bike sharing application may further automatically execute a corresponding bike renting service according to tag content transmitted by the NFC tag. In this way, even use of a shared bike at night is not affected by insufficient light.

Corresponding to the embodiment of the foregoing method for quick enabling a service in an application program, this specification further provides an embodiment of an apparatus for quick enabling a service in an application program. The apparatus embodiment may be implemented by software, or may be implemented by hardware or a combination of hardware and software. Using an implementation by software as an example, an apparatus in a logical sense is formed by a processor in a device in which the apparatus is located by reading a computer program instruction corresponding to a non-volatile memory into a memory for running. From a hardware level, a hardware structure of the device in which the apparatus for quick enabling a service in an application program in this specification is located may include a processor, a network interface, a memory, and a non-volatile memory, and the device in which the apparatus in this embodiment is located usually may further include other hardware according to an actual function of quick enabling of the service in the application program. Details are not described herein again.

Figure 8:
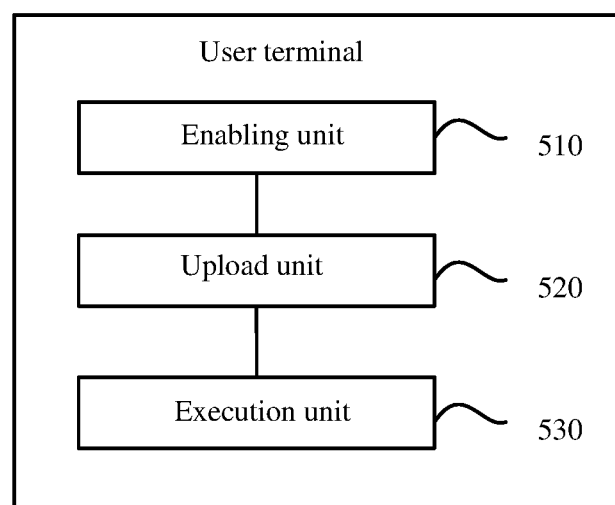
FIG. 8 is a schematic diagram of modules of an apparatus for quick enabling a service in an application program, according to an embodiment of this specification.

FIG. 8 is a diagram of modules of an apparatus for quick enabling a service in an application program, according to an embodiment of this specification. The apparatus corresponds to the embodiment shown in FIG. 5, and the apparatus may include: an enabling unit 510, configured to: enable an application program that has registered NFC when tag content transmitted by an NFC tag is received; an upload unit 520, configured to: upload the tag content to a server; and an execution unit 530, configured to: execute a service routed by the server after the tag content is decoded by the server.

In one embodiment, the enabling unit 510 may include: a presentation subunit, configured to: when the tag content transmitted by the NFC tag is received, and when there are at least two application programs that have registered NFC, present the application programs that have registered NFC in a screen; and an enabling subunit, configured to enable an application program selected by a user. In one embodiment, the enabling unit 510 may be configured to, when the tag content transmitted by the NFC tag is received, enable an application program that has registered NFC and that is associated with the NFC tag. In one embodiment, the tag content transmitted by the NFC tag is encrypted tag content. The apparatus may further include a decryption unit, configured to decrypt the tag content. In one embodiment, the tag content may include at least a service source. The apparatus may further include a determining unit, configured to determine whether the service source in the tag content is the enabled application program. The upload unit 520 may be configured to, when an application identifier in the tag content represents the enabled application program, upload the tag content to the server. In one embodiment, the tag content may include at least a service type; and the service routed by the server after decoding the tag content may be routed according to a service type decoded from the tag content. In one embodiment, the receiving tag content transmitted by an NFC tag may include: receiving tag content transmitted by an NFC tag that is sent by a smart wearable device, after the smart wearable device receives the tag content transmitted by the NFC tag. In one embodiment, the application program may include a payment application, and the service may include a payment service; or the application program may include a bike sharing application, and the service may include a bike renting service.

Figure 9:
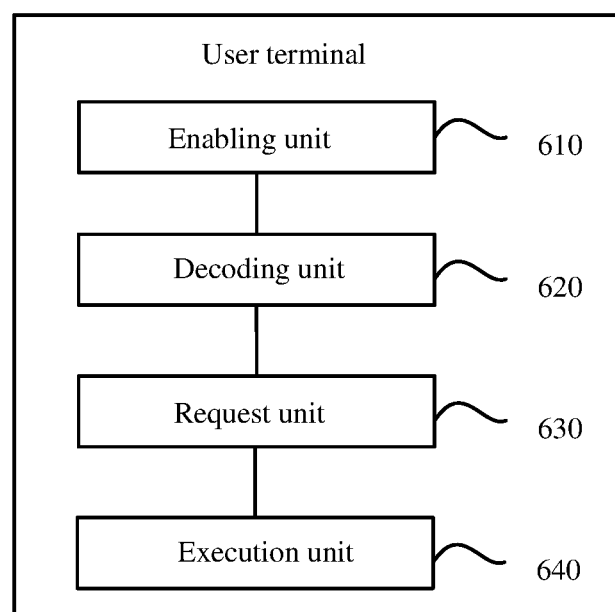
FIG. 9 is a schematic diagram of modules of an apparatus for quick enabling a service in an application program, according to an embodiment of this specification.

FIG. 9 is a diagram of modules of an apparatus for quick enabling a service in an application program, according to an embodiment of this specification. The apparatus corresponds to the embodiment shown in FIG. 6, and the apparatus may include: an enabling unit 610, configured to: enable an application program that has registered NFC when tag content transmitted by an NFC tag is received; a decoding unit 620, configured to decode the tag content to obtain a service type; a request unit 630, configured to initiate a service request of the service type to a server according to the service type; and an execution unit 640, configured to execute a service that is routed by the server and that corresponds to the service request.

In one embodiment, the enabling unit 610 may include: a presentation subunit, configured to: when there are at least two application programs that have registered NFC, present the application programs that have registered NFC in a screen; and an enabling subunit, configured to enable an application program selected by a user. In one embodiment, the enabling unit 610 may be configured to: when the tag content transmitted by the NFC tag is received, enable an application program that has registered NFC and that is associated with the NFC tag. In one embodiment, the tag content transmitted by the NFC tag is encrypted tag content. In one embodiment, the apparatus may further include: a decryption unit, configured to decrypt the tag content. In one embodiment, the tag content may include at least a service source. In one embodiment, the apparatus may further include: a determining unit, configured to determine whether the service source in the tag content is the enabled application program; and the decoding unit 620 may include: when an application identifier in the tag content represents the enabled application program, decode the tag content to obtain the service type. In one embodiment, the receiving tag content transmitted by an NFC tag may include: receiving tag content transmitted by an NFC tag that is sent by a smart wearable device, after the smart wearable device receives the tag content transmitted by the NFC tag. In one embodiment, the application program may include a payment application, and the service may include a payment service; or the application program may include a bike sharing application, and the service may include a bike renting service.

The system, apparatus, module, or unit elaborated in the foregoing embodiments may be implemented by a computer chip or entity, or by a product with a particular function. A typical implementation device is a computer. A specific form of the computer may be a personal computer, a laptop computer, a cellular phone, a camera phone, a smartphone, a personal digital assistant, a media player, a navigation device, an e-mail sending and receiving device, a game console, a tablet computer, a wearable device, or any combination of these devices.

For implementation processes of the function and the effect of each unit in the foregoing apparatus, refer to implementation processes of the corresponding steps in the foregoing method. Details are not described herein again.

An apparatus embodiment basically corresponds to a method embodiment. Therefore, for related parts thereof, refer to some descriptions in the method embodiment. The apparatus embodiment described above is merely exemplary. Units described as separated components may be or may not be physically separated. Components presented as units may be or may not be physical units. That is, the components may be located in a same place, or may be distributed on a plurality of network units. Some or all of the modules may be selected according to actual needs to achieve the objectives of the solutions of this specification. The above may be understood and implemented by a person of ordinary skill in the art without creative efforts.

FIG. 6 illustrates a quick enabling method for a service in an application program, and the method may be essentially performed by an electronic device, including: a processor; and a memory that is configured to store an instruction executable by the processor, where the processor is configured to: enable an application program that has registered NFC when tag content transmitted by an NFC tag is received; upload the tag content to a server; and execute a service routed by the server after the tag content is decoded by the server.

In one embodiment, the enabling an application program that has registered NFC may include: when there are at least two application programs that have registered NFC, presenting, by the operating system, the application programs that have registered NFC in a screen; and enabling an application program selected by a user. In one embodiment, the enabling, by an operating system, an application program that has registered NFC may include: enabling an application program that has registered NFC and that is associated with the NFC tag. In one embodiment, the tag content transmitted by the NFC tag is encrypted tag content; and before the uploading the tag content to a server, the processor may be further configured to: decrypt the tag content. In one embodiment, the tag content may include at least a service source; and before the uploading the tag content to a server, the processor may be further configured to: determine whether the service source in the tag content is the enabled application program; and the uploading the tag content to a server may include: when an application identifier in the tag content represents the enabled application program, uploading the tag content to the server. In one embodiment, the tag content may include at least a service type; and the service routed by the server after decoding the tag content may be routed according to a service type decoded from the tag content. In one embodiment, the receiving tag content transmitted by an NFC tag may include: receiving tag content transmitted by an NFC tag that is sent by a smart wearable device, after the smart wearable device receives the tag content transmitted by the NFC tag. In one embodiment, the application program may include a payment application, and the service may include a payment service; or the application program may include a bike sharing application, and the service may include a bike renting service.

FIG. 6 illustrates a quick enabling method for a service in an application program, and the method may be essentially performed by an electronic device, including: a processor; and a memory that is configured to store an instruction executable by the processor, where the processor is configured to: enable an application program that has registered NFC when tag content transmitted by an NFC tag is received; decode the tag content to obtain a service type; initiate a service request of the service type to a server according to the service type; and execute a service that is routed by the server and that corresponds to the service request.

In one embodiment, the enabling an application program that has registered NFC may include: when there are at least two application programs that have registered NFC, presenting, by the operating system, the application programs that have registered NFC in a screen; and enabling an application program selected by a user. In one embodiment, the enabling an application program that has registered NFC may include: enabling an application program that has registered NFC and that is associated with the NFC tag. In one embodiment, the tag content transmitted by the NFC tag is encrypted tag content; and before the decoding, the processor may be further configured to: decrypt the tag content. In one embodiment, the tag content may include at least a service source; and before the decoding the tag content to obtain a service type, the processor may be further configured to: determine whether the service source in the tag content is the enabled application program; and the decoding the tag content to obtain a service type may include: when an application identifier in the tag content represents the enabled application program, decoding the tag content to obtain the service type. In one embodiment, the receiving tag content transmitted by an NFC tag may include: receiving tag content transmitted by an NFC tag that is sent by a smart wearable device, after the smart wearable device receives the tag content transmitted by the NFC tag. In one embodiment, the application program may include a payment application, and the service may include a payment service; or the application program may include a bike sharing application, and the service may include a bike renting service. In some embodiments, in the foregoing embodiments of the electronic device, the processor may be a central processing unit (English: Central Processing Unit, CPU for short), or may be another general-purpose processor, a digital signal processor (English: Digital Signal Processor, DSP for short), an application specific integrated circuit (English: Application Specific Integrated Circuit, ASIC for short), or the like. The general-purpose processor may be a micro-processor, or any conventional processor, or the like. The foregoing memory may be a read-only memory (ROM), a random-access memory (RAM), a flash memory, a hard disk, or a solid-state disk. The steps of the methods disclosed in the embodiments of the present invention may be directly embodied as being executed by a hardware processor, or by a combination of hardware in a processor and software modules.

The embodiments in this specification are all described in a progressive manner, for same or similar parts in the embodiments, refer to these embodiments, and descriptions of each embodiment focus on a difference from other embodiments. Especially, an electronic device embodiment is basically similar to a method embodiment, and therefore is described briefly; for related parts, reference may be made to partial descriptions in the method embodiment.

Other embodiments of this specification may be apparent to those skilled in the art from consideration of the specification and practice of this specification disclosed here. This specification is intended to cover any variations, uses, or adaptations of this specification following the general principles thereof and including such departures from this specification as come within known or customary practice in the art. It is intended that the specification and examples be considered as exemplary only, with a true scope and spirit of this specification being indicated by the following claims.

It may be appreciated that this specification is not limited to the exact construction that has been described above and illustrated in the accompanying drawings, and that various modifications and changes may be made without departing from the scope thereof. It is intended that the scope of this specification only be limited by the appended claims.

What is claimed is:

1. A computer-implemented method, the method comprising:
   receiving, by a client device, tag content transmitted by a near field communication (NFC) tag, wherein the tag content comprises data indicating a service source and a service type;
   enabling, by an operating system of the client device, an application program that has registered NFC and is associated with the NFC tag;
   determining, by the client device, whether the enabled application program matches the service source;
   decoding, by the enabled application program, the tag content to obtain the service type;
   sending, by the enabled application program, a service request of the service type to a hosting server of the enabled application program; and
   executing, by the enabled application program, a service routed by the hosting server according to the service request.

2. The method of claim 1, wherein enabling the application program that has registered NFC and is associated with the NFC tag comprises: presenting, by the operating system of the client device, a plurality of application programs that have registered NFC with the operating system; and enabling, by the operating system of the client device, one application program of the plurality of application programs according to a user selection.

3. The method or claim 1, wherein the tag content transmitted by the NFC tag is encrypted tag content, and the method further comprising: decrypting, by the enabled application program, the tag content.

4. The method of claim 1, wherein receiving the tag content, comprises: receiving the tag content from a smart wearable device that receives the tag content transmitted by the NFC tag.

5. The method of claim 1, wherein the application program comprises a payment application, and the service source comprises a payment service.

6. The method of claim 1, wherein the application program comprises a bike sharing application, and the service source comprises a bike renting service.

7. The method of claim 1, wherein the service request comprises a payment service request, and the service routed by the server comprises a payment service.

8. The method of claim 1, wherein the service request comprises a money collection service request, and the service routed by the server comprises a money collection service.

9. A system comprising one or more processors and one or more non-transitory computer-readable memories coupled to the one or more processors, the one or more non-transitory computer-readable memories storing instructions that, when executed by the one or more processors, cause the system to perform operations comprising:
receiving tag content transmitted by a near field communication (NFC) tag, wherein the tag content comprises data indicating a service source and a service type:
enabling an application program that has registered NFC and is associated with the NFC tag;
determining whether the enabled application program matches the service source;
decoding, by the enabled application program, the tag content to obtain the service type;
sending, by the enabled application program, a service request of the service type to a hosting server of the enabled application program; and
executing, by the enabled application program, a service routed by the hosting server according to the service request.

10. The system of claim 9, wherein enabling the application program that has registered NFC and is associated with the NFC tag comprises: presenting a plurality of application programs that have registered NFC with the system; and enabling one application program of the plurality of application programs according to a user selection.

11. The system of claim 9, wherein the tag content transmitted by the NFC tag is encrypted tag content, and the method further comprising: decrypting, by the enabled application program, the tag content.

12. The system of claim 9, wherein receiving the tag content, comprises: receiving the tag content from a smart wearable device that receives the tag content transmitted by the NFC tag.

13. The system of claim 9, wherein the application program comprises a payment application, and the service source comprises a payment service.

14. The system of claim 9, wherein the application program comprises a bike sharing application, and the service source comprises a bike renting service.

15. A non-transitory computer-readable storage medium storing instructions that, when executed by one or more processors, cause the one or more processors to perform operations comprising:
receiving tag content transmitted by a near field communication (NFC) tag, wherein the tag content comprises data indicating a service source and a service type:
enabling an application program that has registered NFC and is associated with the NFC tag;
determining whether the enabled application program matches the service source;
decoding, by the enabled application program, the tag content to obtain the service type;
sending, by the enabled application program, a service request of the service type to a hosting server of the enabled application program; and
executing, by the enabled application program, a service routed by the hosting server according to the service request.

16. The non-transitory computer-readable storage medium of claim 15, wherein enabling the application program that has registered NFC and is associated with the NFC tag comprises: presenting a plurality of application programs that have registered NFC; and enabling one application program of the plurality of application programs according to a user selection.

17. The non-transitory computer-readable storage medium of claim 15, wherein the tag content transmitted by the NFC tag is encrypted tag content, and the method further comprising: decrypting, by the enabled application program, the tag content.

18. The non-transitory computer-readable storage medium of claim 15, wherein receiving the tag content, comprises: receiving the tag content from a smart wearable device that receives the tag content transmitted by the NFC tag.

19. The non-transitory computer-readable storage medium of claim 15, wherein the application program comprises a payment application, and the service source comprises a payment service.

20. The non-transitory computer-readable storage medium of claim 15, wherein the tag content transmitted by an NFC tag is sent by a smart wearable device, after the smart wearable device receives the tag content transmitted by the NFC tag.

* * * * *

UNITED STATES PATENT AND TRADEMARK OFFICE
CERTIFICATE OF CORRECTION

| | | |
|---|---|---|
| PATENT NO. | : 10,945,114 B2 | Page 1 of 1 |
| APPLICATION NO. | : 17/028482 | |
| DATED | : March 9, 2021 | |
| INVENTOR(S) | : Landong Zhao | |

It is certified that error appears in the above-identified patent and that said Letters Patent is hereby corrected as shown below:

In the Claims

Claim 7, Column 17, Line 6:
"the service routed by the server" should read -- the service routed by the hosting server --.

Claim 8, Column 17, Line 9:
"the service routed by the server" should read -- the service routed by the hosting server --.

Signed and Sealed this
Twenty-ninth Day of August, 2023

*Katherine Kelly Vidal*

Katherine Kelly Vidal
*Director of the United States Patent and Trademark Office*